US005794127A

United States Patent [19]

Lansang

[11] Patent Number: 5,794,127

[45] Date of Patent: Aug. 11, 1998

[54] HEADPHONE REMOTE CONTROL FOR OPERATING AN ENTERTAINMENT CENTER

[76] Inventor: Wilfredo Lansang, 14732 Lefloss Ave., Norwalk, Calif. 90650

[21] Appl. No.: 710,386

[22] Filed: Sep. 16, 1996

[51] Int. Cl.[6] .......... H04B 7/00

[52] U.S. Cl. .......... 455/66; 455/100; 455/151.2; 455/352; 455/355; 381/183; 348/734; 340/825.72

[58] Field of Search .......... 455/403, 41, 66, 455/568, 569, 575, 90, 92, 95, 100, 151.1, 151.2, 179.1, 188.1, 344, 350, 351, 352, 353, 355; 340/539, 568, 825.69, 825.72, 693; 341/173, 176; 381/183, 187; 379/430; 348/734; 359/189

[56] References Cited

U.S. PATENT DOCUMENTS

| | | | |
|---|---|---|---|
| 4,612,668 | 9/1986 | Sarac | 455/128 |
| 4,647,980 | 3/1987 | Steventon et al. | 358/86 |
| 4,845,751 | 7/1989 | Schwab | 455/352 |
| 5,034,996 | 7/1991 | Carey et al. | 455/350 |
| 5,095,382 | 3/1992 | Abe | 359/189 |
| 5,189,517 | 2/1993 | Ohara | 455/151.1 |
| 5,551,065 | 8/1996 | Honore | 455/66 |
| 5,598,143 | 1/1997 | Wentz | 348/734 |

FOREIGN PATENT DOCUMENTS

| | | | |
|---|---|---|---|
| 4-10877 (A) | 1/1992 | Japan | H04N 5/60 |

OTHER PUBLICATIONS

Stereo Reviews "Zentek's CS720 Wireless Headphone System", Nov./94.

"Cordless TV Headphones Let You Listen Privately" (455/351).

*Primary Examiner*—Nguyen Vo
*Assistant Examiner*—Doris To

[57] ABSTRACT

A new Headphone Remote Control for Operating an Entertainment Center for offering a headphone with a fully equipped remote control for privately operating and controlling an entertainment center. The inventive device includes an antenna receiver, a channel selector control, a locator speaker, a locator over-ride circuit, a pressure switch, and a head phone transmitter. In use, the Headphone Remote Control for Operating an Entertainment Center 10 is located by clapping one's hands together. When the device is found and placed upon one's head, the pressure switch 28 de-energizes the locator speaker 24 and can selectively energize the vibrator signal 25 which will signal the user when someone wants their attention. While wearing the device, for example, the user is able to watch and listen to the TV while others around him do not hear the TV, but rather, others can concurrently listen to the STEREO instead.

17 Claims, 3 Drawing Sheets

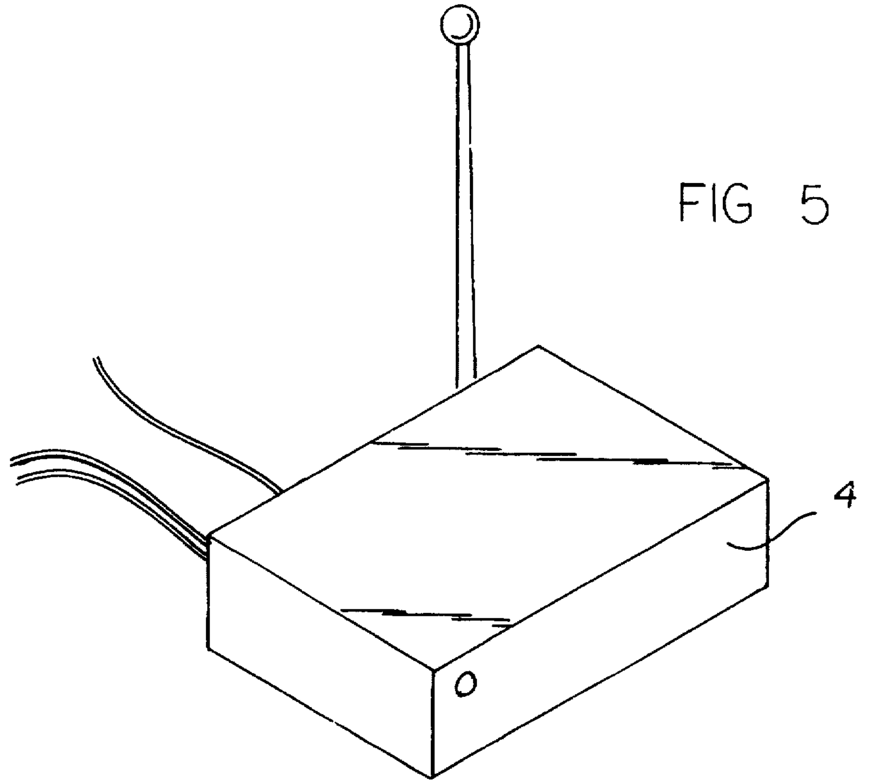
FIG 5
FIG 6
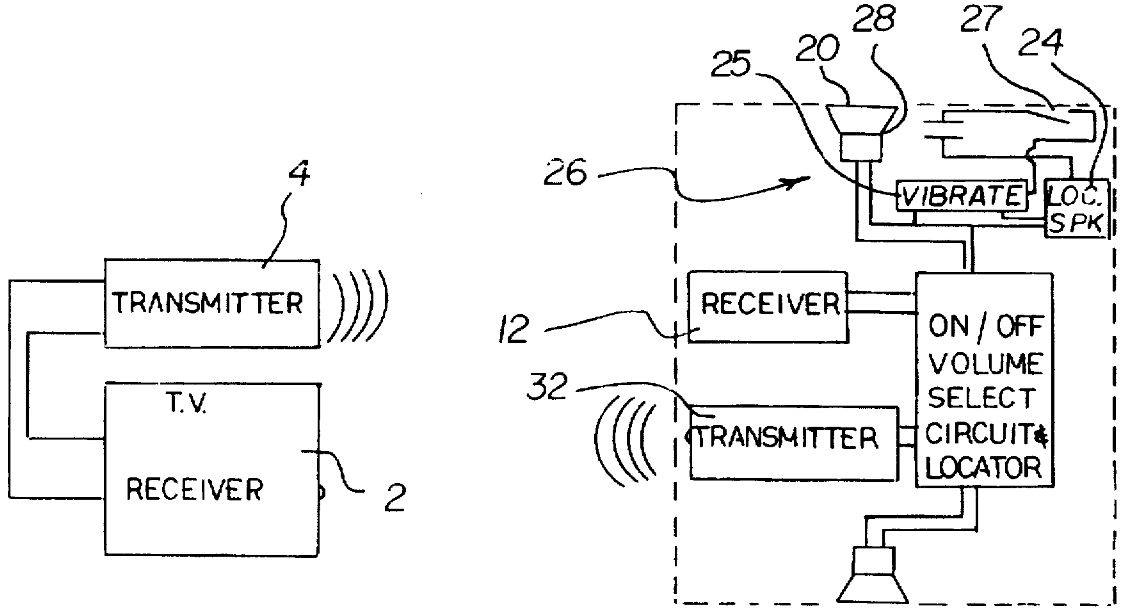

HEADPHONE REMOTE CONTROL FOR OPERATING AN ENTERTAINMENT CENTER

BACKGROUND OF THE INVENTION

1. Field of the Invention

The present invention relates to remote control and listening devices and more particularly pertains to a new Headphone Remote Control for Operating an Entertainment Center for offering a headphone with a fully equipped remote control for privately operating and controlling an entertainment center.

2. Description of the Prior Art

The use of remote control and listening devices is known in the prior art. More specifically, remote control and listening devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art remote control and listening devices include U.S. Pat. No. 5,095,382; U.S. Pat. No. 4,612,668; U.S. Pat. No. 5,189,517; U.S. Pat. No. 4,647,980; U.S. Pat. No. 5,034,996; and U.S. Pat. No. 4,845,751.

While these devices fulfill their respective, particular objectives and requirements, the aforementioned patents do not disclose a new Headphone Remote Control for Operating an Entertainment Center. The inventive device includes an antenna receiver, a channel selector control, a locator speaker, a locator over-ride circuit, a pressure switch, and a head phone transmitter.

In these respects, the Headphone Remote Control for Operating an Entertainment Center according to the present invention substantially departs from the conventional concepts and designs of the prior art, and in so doing provides an apparatus primarily developed for the purpose of offering a headphone with a fully equipped remote control for privately operating and controlling an entertainment center.

SUMMARY OF THE INVENTION

In view of the foregoing disadvantages inherent in the known types of remote control and listening devices now present in the prior art, the present invention provides a new Headphone Remote Control for Operating an Entertainment Center construction wherein the same can be utilized for offering a headphone with a fully equipped remote control for privately operating and controlling an entertainment center.

The general purpose of the present invention, which will be described subsequently in greater detail, is to provide a new Headphone Remote Control for Operating an Entertainment Center apparatus and method which has many of the advantages of the remote control and listening devices mentioned heretofore and many novel features that result in a new Headphone Remote Control for Operating an Entertainment Center which is not anticipated, rendered obvious, suggested, or even implied by any of the prior art remote control and listening devices, either alone or in any combination thereof.

To attain this, the present invention generally comprises an antenna receiver, a channel selector control, a locator speaker, a locator over-ride circuit, a pressure switch, and a head phone transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Headphone Remote Control for Operating an Entertainment Center apparatus and method which has many of the advantages of the remote control and listening devices mentioned heretofore and many novel features that result in a new Headphone Remote Control for Operating an Entertainment Center which is not anticipated, rendered obvious, suggested, or even implied by any of the prior art remote control and listening devices, either alone or in any combination thereof.

It is another object of the present invention to provide a new Headphone Remote Control for Operating an Entertainment Center which may be easily and efficiently manufactured and marketed.

It is a further object of the present invention to provide a new Headphone Remote Control for Operating an Entertainment Center which is of a durable and reliable construction. Center which is susceptible of a low cost of manufacture with regard to both materials and labor, and which accordingly is then susceptible of low prices of sale to the consuming public, thereby making such Headphone Remote Control for Operating an Entertainment Center economically available to the buying public.

Still yet another object of the present invention is to provide a new Headphone Remote Control for Operating an Entertainment Center which provides in the apparatuses and methods of the prior art some of the advantages thereof, while simultaneously overcoming some of the disadvantages normally associated therewith.

Still another object of the present invention is to provide a new Headphone Remote Control for Operating an Entertainment Center for offering a headphone with a fully equipped remote control for privately operating and controlling an entertainment center.

Yet another object of the present invention is to provide a new Headphone Remote Control for Operating an Entertainment Center which includes an antenna receiver, a channel selector control, a locator speaker, a locator override circuit, a pressure switch, and a head phone transmitter.

Still yet another object of the present invention is to provide a new Headphone Remote Control for Operating an Entertainment Center that can change the channels of a TV or switch from TV to stereo or cable, etc.

Even still another object of the present invention is to provide a new Headphone Remote Control for Operating an Entertainment Center that can emit a signal for aiding in locating the device.

Even still another object of the present invention is to provide a new Headphone Remote Control for Operating an Entertainment Center that can not emit a locating signal when the device is worn upon the user's head.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged illustration of an entertainment center transmitter of the present invention.

FIG. 6 is a schematical illustration of the system of the basic invention.

DESCRIPTION OF THE PREFERRED EMBODIMENT

Figure 1:
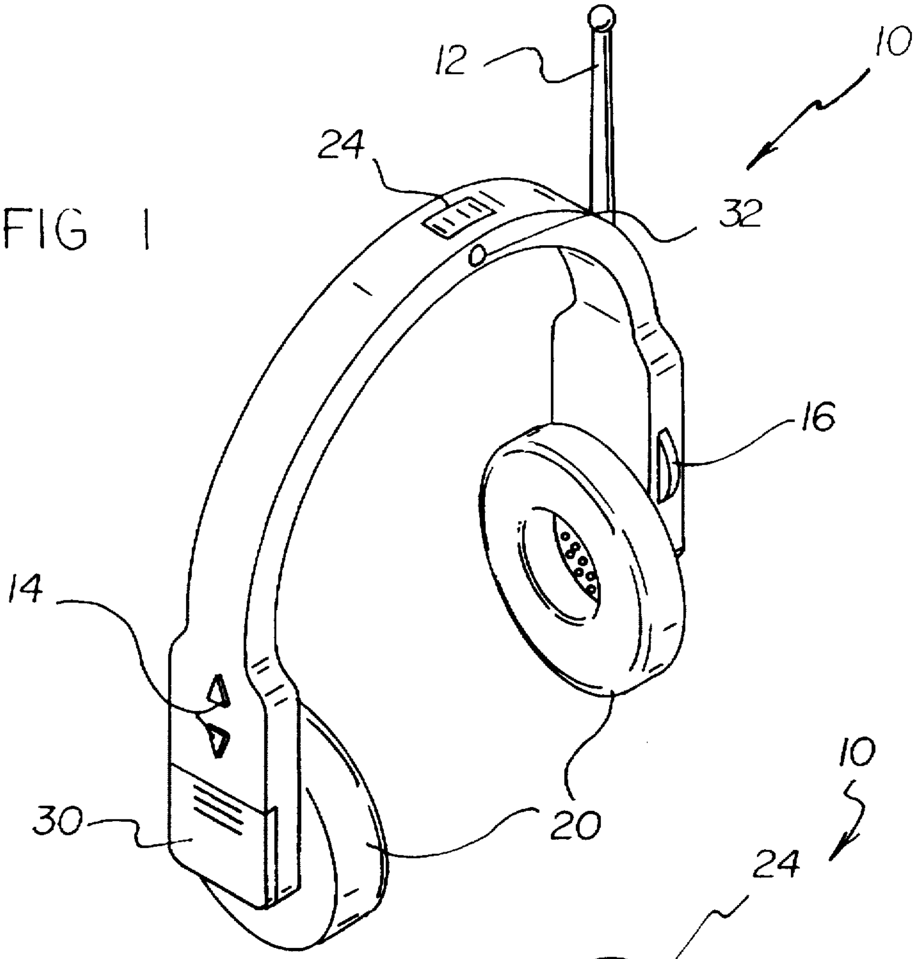
FIG. 1 is a right side perspective view of a new Headphone Remote Control for Operating an Entertainment Center according to the present invention.
Figure 2:
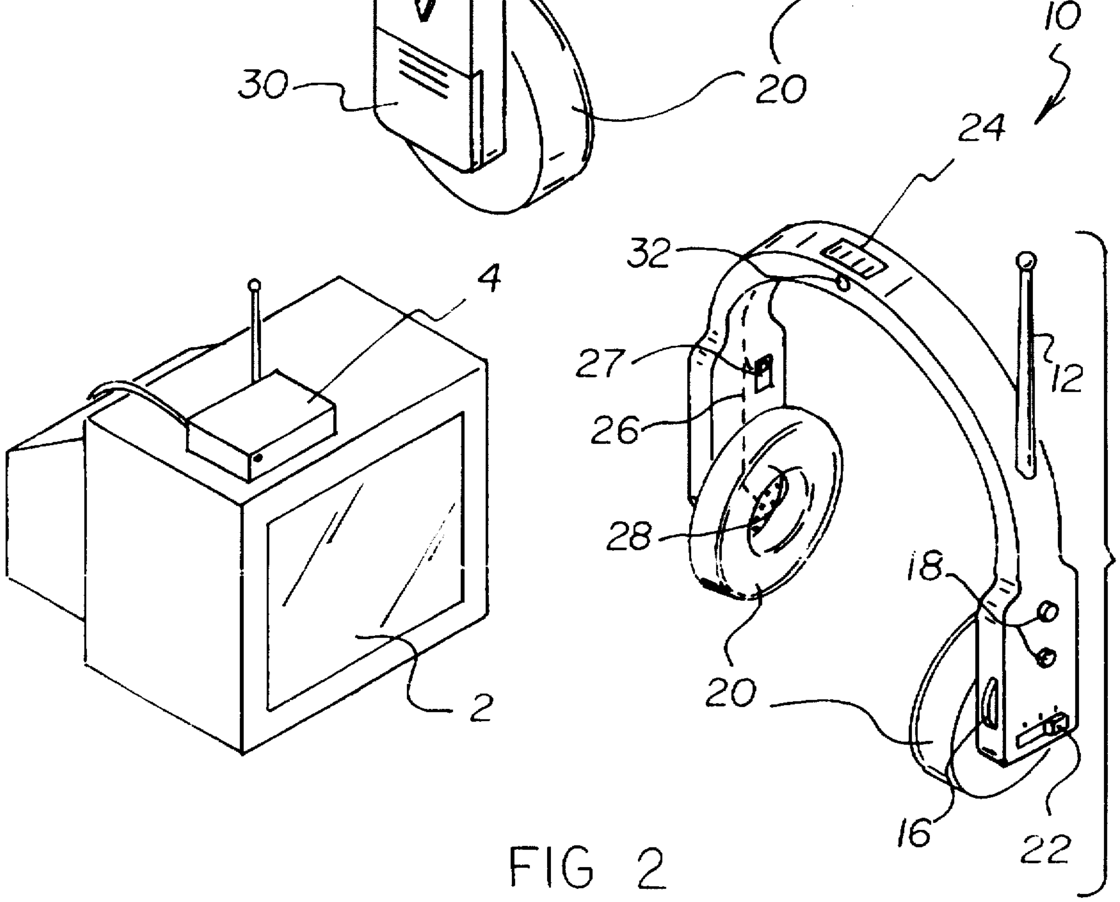
FIG. 2 is a perspective view of an entire system of a new Headphone Remote Control for Operating an Entertainment Center according to the present invention.
Figure 3:
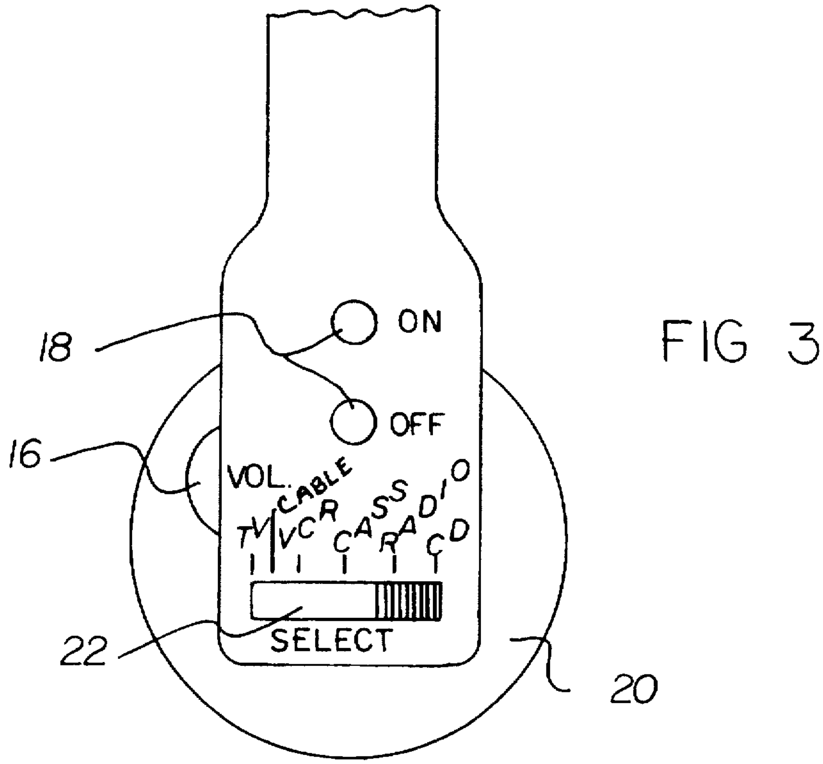
FIG. 3 is an enlarged illustration of the left side of the present invention.
Figure 4:
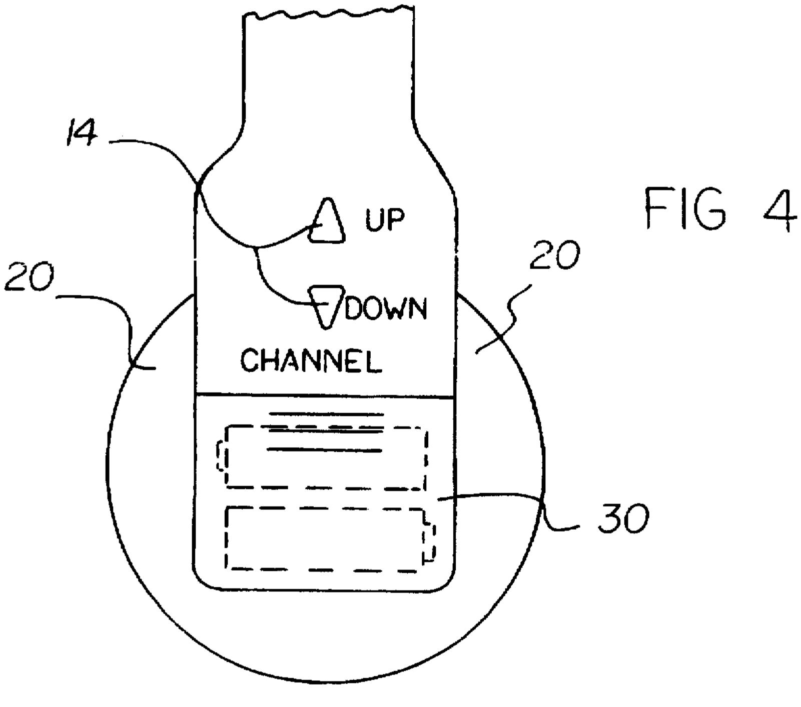
FIG. 4 is an enlarged illustration of the right side of the present invention.

With reference now to the drawings, and in particular to FIGS. 1 through 6 thereof, a new Headphone Remote Control for Operating an Entertainment Center embodying the principles and concepts of the present invention and generally designated by the reference numeral 10 will be described.

More specifically, it will be noted that the Headphone Remote Control for Operating an Entertainment Center 10 comprises an antenna receiver 12, a channel selector control 14, a locator speaker 24, a locator over-ride circuit 26, a pressure switch 28, and a head phone transmitter 32 where the antenna receiver 12, the channel selector control 14, the locator speaker 24, the locator over-ride circuit 26, the pressure switch 28, and the head phone transmitter 32 are electrically connected to each other and each is fixedly and integratedly installed into the Headphone Remote Control for Operating an Entertainment Center 10.

As best illustrated in FIGS. 1 through 6, it can be shown that the Headphone Remote Control for Operating an Entertainment Center 10 further comprises a volume control 16, an on-off control 18, ear pieces 20, and a power supply 30 where the Headphone Remote Control for Operating an Entertainment Center 10 receives electrical energy from the power supply 30 and is selectively energized by use of the on-off control 18 and where the ear pieces 20 are also electrically connected to the volume control 16, the power supply 30, and the on-off control 18, and where the volume control 16 controls the audible sound level in the ear pieces 16.

Additionally, the Headphone Remote Control for Operating an Entertainment Center 10 comprises an entertainment selector 22 which selectively controls a TV-CABLE-VCR-STEREO entertainment center 2 where the TV-CABLE-VCR-STEREO entertainment center 2 is equipped with an entertainment center transmitter-receiver 4 for sending and receiving messages from and to the Headphone Remote Control for Operating an Entertainment Center 10 and the entertainment selector 22 selectively energizes either the TV or the VCR, or the CABLE, or the STEREO or when there is a plurality of the Headphone Remote Control for Operating an Entertainment Center 10 present, a person can listen to the STEREO while another person watches and listens to the TV.

Furthermore, when one person is watching and listening to the TV, another person without the Headphone Remote Control for Operating an Entertainment Center 10 can listen to the STEREO.

The Headphone Remote Control for Operating an Entertainment Center 10 being equipped with the locator speaker 24, the locator over-ride circuit 26, the pressure switch 28, an over-ride switch 27, and a vibrator signal 25, when not worn on a person's head, can be located by a loud audible such as made by clapping a person's hands together. When the Headphone Remote Control for Operating an Entertainment Center 10 is worn on a person's head, the pressure switch 28 opens the locator over-ride circuit 26, preventing the locator speaker 24 from operating.

Also, while the Headphone Remote Control for Operating an Entertainment Center 10 is being worn, the pressure switch 28 can energize the over-ride switch 27 which in turn can be set to energize the vibrator signal 25 so that the Headphone Remote Control for Operating an Entertainment Center 10 vibrates when someone makes a loud audible such as made by clapping a person's hands together.

In use, the Headphone Remote Control for Operating an Entertainment Center 10 is located by clapping one's hands together. When the device is found and placed upon one's head, the pressure switch 28 de-energizes the locator speaker 24 and can selectively energize the vibrator signal 25 which will signal the user when someone wants their attention. While wearing the device, for example, the user is able to watch and listen to the TV while others around him do not hear the TV, but rather, others can concurrently listen to the STEREO instead.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Headphone Remote Control for Operating an Entertainment Center comprising: an antenna receiver, a channel selector control, a locator speaker, a locator over-ride circuit, a pressure switch, and a head phone transmitter where the antenna receiver, the channel selector control, the locator speaker, the locator over-ride circuit, the pressure switch, and the head phone transmitter are electrically connected to each other and each is fixedly and integratedly installed into the headphone remote control for operating an entertainment center.

2. The headphone remote control for operating an entertainment center of claim 1, wherein the headphone remote control further comprises a volume control, an on-off control, ear pieces, and a power supply where the headphone remote control receives electrical energy from the power supply and is selectively energized by use of the on-off control and where the ear pieces are also electrically connected to the volume control, the power supply, and the on-off control, and where the volume control controls the audible sound level in the ear pieces.

3. The headphone remote control for operating an entertainment center of claim 2, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the tv.

4. The headphone remote control for operating an entertainment center of claim 2, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the vcr.

5. The headphone remote control for operating an entertainment center of claim 2, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the stereo.

6. The headphone remote control for operating an entertainment center of claim 5, wherein the headphone remote control comprises a plurality of the headphone remote controls for operating an entertainment center and a person can listen to the stereo while another person watches and listens to the tv.

7. The Headphone Remote Control for Operating an Entertainment Center of claim 6, wherein when one person is watching and listening to the tv, another person without the headphone remote control for operating an entertainment center can listen to the stereo.

8. The headphone remote control for operating an entertainment center of claim 7, wherein the headphone remote control, being equipped with the locator speaker, the locator over-ride circuit, the pressure switch, an over-ride switch, and a vibrator signal, when not worn on a person's head, can be located by a loud audible sound.

9. The headphone remote control for operating an entertainment center of claim 8, wherein the headphone remote control is worn on a person's head, and the pressure switch opens the locator over-ride circuit, preventing the locator speaker from operating.

10. The headphone remote control for operating an entertainment center of claim 9, wherein while the headphone remote control is being worn, the pressure switch can energize the over-ride switch which in turn can be set to energize the vibrator signal so that the headphone remote control vibrates when someone makes a loud audible sound.

11. The headphone remote control for operating an entertainment center of claim 10, where in use, the headphone remote control is located by clapping one's hands together and when the headphone remote control is found and placed upon one's head, the pressure switch de-energizes the locator speaker and can selectively energize the vibrator signal which will signal the user when someone wants their attention and while wearing the headphone remote control, the user is able to watch and listen to the tv while others around him do not hear the tv, and concurrently listen to the stereo.

12. The headphone remote control for operating an entertainment center of claim 8, wherein while the headphone remote control is being worn, the pressure switch can energize the over-ride switch which in turn can be set to energize the vibrator signal so that the headphone remote control vibrates when someone makes a loud audible sound.

13. The headphone remote control for operating an entertainment center of claim 8, where in use, the headphone remote control is located by clapping one's hands together and when the headphone remote control is found and placed upon one's head, the pressure switch de-energizes the locator speaker and can selectively energize the vibrator signal which will signal the user when someone wants their attention and while wearing the headphone remote control, the user is able to watch and listen to the tv while others around him do not hear the tv, and concurrently listen to the stereo.

14. The headphone remote control for operating an entertainment center of claim 1, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the tv.

15. The headphone remote control for operating an entertainment center of claim 1, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the vcr.

16. The headphone remote control for operating an entertainment center of claim 1, wherein the headphone remote control comprises an entertainment selector which selectively controls a tv-cable-vcr-stereo entertainment center where the tv-cable-vcr-stereo entertainment center is equipped with an entertainment center transmitter-receiver for sending and receiving messages from and to the headphone remote control and the entertainment selector selectively energizes the stereo.

17. The headphone remote control for operating an entertainment center of claim 1, wherein the headphone remote control is worn on a person's head, and the pressure switch opens the locator over-ride circuit, preventing the locator speaker from operating.

* * * * *